United States Patent Office 2,960,453
Patented Nov. 15, 1960

2,960,453
PROCESS FOR TREATING PLASTICS AND PRODUCTS THEREOF

Paul M. Cook, Menlo Park, James B. Meikle, Palo Alto, and Bruce Graham, Los Altos, Calif., assignors, by mesne assignments, to W. R. Grace & Co., New York, N.Y., a corporation of Connecticut No Drawing. Filed Sept. 6, 1955, Ser. No. 532,805

17 Claims. (Cl. 204—154)

This invention relates to the production of plastic materials and has particular reference to the treatment of polymerized resinous materials by irradiation to improve the physical and chemical properties thereof.

One of the principal objects of this invention it to provide a novel process for the treatment of plastics by irradiation.

Another object of this invention is to provide a novel irradiation process for the treatment of resin polymers to produce new and improved plastic materials therefrom.

A further object of this invention is to provide a novel process for the treatment of polymerized resinous materials to increase the heat resistance, tensile strength and elongation thereof.

It is now well known that certain properties of resinous materials such as the thermoplastics and the precursors of thermosetting resins (i.e., monomers and linear low polymers) are improved by moderate doses of high energy radiation of the order of $1 \times 10^6$ to $1 \times 10^8$ rep. (Roentgen equivalent physical). Such treatment is believed to result in cross-linking of the polymerized chains which make up the resin. In those plastics containing carbon chains, a related chemical effect, i.e., the formation of double bonds, is also believed to be produced. Another object of this invention is to provide an improved irradiation process in which is utilized an agent which induces cross-linking or actually becomes a part of the cross-linking bridge.

Another object of this invention is to provide a process for the irradiation of resinous polymers which includes a thermal treatment step to produce products demonstrating improved physical properties over those produced by conventional irradiation techniques.

Still another object of this invention is to provide a novel process for the production of cellular (foamed) and non-cellular plastic materials.

Other objects and advantages of this invention it is believed will be readily apparent from the following detailed description of preferred embodiments thereof.

Briefly, this invention comprehends within its scope the discovery that certain physical properties of plastic resins subjected to high energy radiation are improved by carrying out the irradiation in the presence of sulfur, selenium, tellurium and compounds containing these elements. These elements and compounds are generically referred to herein as "bridging agents." Although the mechanism or mechanisms by which these bridging agents produce this new and unexpected result are not completely understood, it is believed that in some manner they induce or enhance the cross-linking effect which is generally believed to result from conventional irradiation treatments, and further it is believed that the sulfur, selenium or tellurium and/or the molecular moieties containing these elements actually becomes or become a part of the cross-linking bridge. This latter phenomenon appears to be enhanced by subjecting the product to the action of heat aging. In carrying out the process, vulcanization accelerators such as the mercapto-thiozoles, thiuram sulfides, guanidines, selenium diethyl dithiocarbamate, and amine-aldehyde reaction products may be added to the resin. The sulfur- and selenium-containing accelerators, such as the thiuram sulfides, also function as bridging agents. Additionally, conventional antioxidants may be added such as, for example, diphenyl-p-phenylenediamine, Ionol, phenyl-$\alpha$-naphthyl amine, diarylamines, and ketone reaction products of arylamines.

Thermoplastics and the precursors of thermosetting resins, suitably blended with these materials become, upon irradiation, cross-linked as evidence by an increase in their resistance to heat, their tensile strength and elongation. Particularly significant is their resistance to flow and distortion at temperatures well above the ranges of flow and distortion for the same irradiated plastics not containing these materials, especially when exposed over extended periods of time. Most of the plastics after irradiation demonstrate a further improvement in properties upon being annealed or heat treated at 130–160° C. for several hours. One outstandingly useful application of this material is in the manufacture of electric components insulated with heat resistant plastics; particularly in the case of foamed or cellular insulations such as foamed polyethylene the process finds a convenient application. This is possibly because the blowing agents can also function as precursors of bridging agents, and as a source of free radicals which are formed during the blowing process. For example, disulfonyl hydrazides, which are mentioned in the literature (Ind. and Eng. Chem. 44, 119 (1952)) and which include m-benzene-bis (sulfonyl-hydrazide), p,p'-diphenyl bis(sulfonyl hydrazide), and p,p'-oxybis (benzene sulfonyl-hydrazide), decompose to furnish nitrogen for the blowing of plastics such as polyethylene and at the same time leave residual free radicals which can react with their environment or with themselves. In the process of this invention are produced sulfur-containing polymers in which the sulfur exists as sulfide and disulfide linkages as well as sulfone linkages.

In carrying out the process of this invention as applied to cellular materials, the blowing agents (bis(sulfonyl hydrazides)) are added, along with suitable accelerators and antioxidants or with only the antioxidants, to the molten plastic at a temperature below the blowing point of the sulfonyl hydrazide but above the melting point of the plastic. If a non-sulfur-containing blowing agent is utilized, sulfur or one or more sulfur-containing compounds must be included in the plastic mix. The blend is then applied to the component which is to be insulated, at such a temperature that it is blown in the application process (for instance, extrusion of wire coating utilizing cellular polyethylene). The components and foamed insulation are then subjected to ionizing radiation at a suitable dose level, such as $1 \times 10^6$ to $1 \times 10^8$ rep., during which process cross-linking occurs at an accelerated rate. Unsupported sheets and blocks may also be produced by this method. If desired, the irradiation treatment may precede the blowing step. Further improvement in the heat resistance of the polymer can then be obtained by heat treating the blown and irradiated material (at 130 to 160° C. in the case of polyethylene). Of course, as frequently occurs in the case of electrical components, if they are to be placed in an environment where they will be subjected to temperatures at these ranges the heat treatment is unnecessary because they will automatically be annealed in their operational environment.

The bis(sulfonyl hydrazides) are also useful for forming radiation-adapted plastics which are non-cellular. The processing steps in this case are, mixing the bis(sulfonyl hydrazides) with the polymer along with suitable antioxidants and with accelerators, if desired, and then continuing the mixing at an elevated temperature in a range slightly above the blowing point of the bis(sulfonyl hydrazides). Thus, the polymer is mixed with the residue from the bis(sulfonyl hydrazides) after the nitrogen has been driven off. The residual free radicals formed by the exit of the nitrogen can then react with the polymer and with other molecules of its own kind to form polymeric sulfide bearing moieties well distributed throughout the blend. In this form the blend is particularly well arranged for accelerated radiation cross-linking and annealing or thermal vulcanization, yet the material is completely thermoplastic and can be molded to any desired shape and, of course, can be worked until all bubbles of nitrogen are removed and a smooth melt is obtained. The plastic is then broken up or pelletized in particulate, molding compound form to be used to mold the desired articles which in turn are subjected to high energy radiation to cross-link them in the shape of the molded article. Again, heat treating is optional, depending upon the degree of thermal resistance desired and the possibility that the articles will be used in an environment at a temperature suitable for heat annealing.

If desired, the mixing and molding operations may be carried out at a temperature below the blowing point, if a non-cellular product is to be obtained. However, superior results are generally obtained by removal of the nitrogen, as pointed out above.

The process of this invention is applicable to irradiation-susceptible resinous plastic or polymeric materials, i.e., those resinous materials which undergo physical change when exposed to high energy radiation, and it is generally considered by those skilled in the art that this class includes the thermoplastics and the precursors of the thermosetting resins, i.e., monomers and linear low polymers. Specific examples of these plastics are: polyethylene, polymethylene, polyamides, polystyrene, silicones.

Bridging agents other than the bis(sulfonyl-hydrazides) specifically mentioned above include elemental sulfur, selenium and tellurium and compounds and polymers containing these elements, such as selenium diethyl dithiocarbamate, Thiokol VA-3, bis(dimethyl-thiocarbamoyl) disulfide, alkyl phenol sulfides, dipentamethylene, tetrasulfide, 4,4-dithiodimorpholine, 2-mercaptobenzothiazole, benzothiazyl disulfide, zinc salt of 2-mercaptobenzothiazole, tetramethylthiuram monosulfide, tetrabutylthiuram monosulfide, tetramethylthiuram disulfide, tetraethyl thiuram disulfide, zinc dibenzyl dithiocarbamate, zinc dibutyl dithiocarbamate, zinc diethyl dithiocarbamate, zinc dimethyl dithiocarbamate, dibutyl xanthogen disulfide. In fact, any compound in which sulfur, selenium or tellurium is attached only to an atom of carbon-hydrogen, nitrogen or to another sulfur, selenium or tellurium atom, as the case may be, would be suitable. Only minor proportions of the bridging agent are required, the specific amount depending upon the particular resin and agent utilized. Generally, an amount of the cross-linking agent in the neighborhood of 1%, based upon the weight of the resin, is sufficient. However, in the event that a material similar to hard rubber is desired, an amount of bridging agent, such as sulfur, in the neighborhood of 40% may be used, and it is to be understood that the term "minor proportion" as used in the specification and claims herein includes such relatively higher proportion.

The following specific examples are illustrative of the process and product of this invention, but it is to be understood that the invention is not to be limited thereto:

EXAMPLE 1

One hundred parts of commercial polyethylene (melt index of 2.4–1.5; viscosity at 190° C. of $47 \times 10^3$) was melted in a milling machine at a temperature of 110–115° C. One part of p,p'-oxybis benzene sulfonyl-hydrazide, 0.5 part of phenyl-α-naphthyl amine and 0.5 part of N,N'-diphenyl-p-phenylene diamine were added to the melt and thoroughly mixed therein. This mixture was extruded onto wire at a temperature of about 150° C. to produce a cellular coating and the coated wire was then irradiated at a dose level of $1 \times 10^7$ rep. by exposure to cobalt 60 gamma rays at the rate of 900,000 Roentgens per hour and at room temperature. The tensile strength and elongation of 2-inch specimens of this plastic material before irradiation were 837 p.s.i. and 9⅛ inches, respectively; after irradiation these values were 910 p.s.i. and 9½ inches. Samples of the irradiated material were subjected to heat aging at a temperature of 150° C. for 96 hours, resulting in a tensile strength of 1200 p.s.i. and an elongation of 12 inches. By way of comparison, other samples, identical with those described above but substituting a non-sulfur-containing blowing agent for the p,p'-oxybis benzene sulfonyl-hydrazide, were prepared. These samples evidenced considerable reduction in tensile strength after irradiation (from 1660 to about 650 p.s.i.), and upon being subjected to the heat aging treatment, the coatings flowed on the wire and deformed so that they could not be stripped therefrom for testing. These latter samples thus proved to be completely unsatisfactory as wire insulations after aging.

EXAMPLE 2

Wire was covered with cellular polyethylene in the manner described in Example 1, with the exception that only 0.5 part of p,p'-oxybis benzene sulfonyl-hydrazide was utilized. The coated wire was irradiated at a dose level of $2 \times 10^7$ rep. by exposure in the same manner as Example 1. The tensile strength and elongation of 2-inch specimens of this plastic material before irradiation were 960 p.s.i. and 4⅜ inches, respectively; after irradiation these values were 1000 p.s.i. and 4 inches. Samples of the irradiated material were subjected to heat treating at a temperature of 150° C. for 42 hours, resulting in a tensile strength of 1080 p.s.i. and an elongation of 3¾ inches. The shape of the cellular coating was perfectly preserved during this heating treatment.

EXAMPLE 3

Two hundred parts of commercial polyethylene of the type referred to in Example 1, containing customary amounts (0.5%) of aromatic amine antioxidants was blended with 1 part of elemental sulfur at 110–115° C. The plastic was then extruded onto wire as in Example 1 to produce a cellular coating. These samples had a tensile strength of 1470 p.s.i. and an elongation of 8¾ inches. The samples were irradiated at a dose level of $2 \times 10^7$ rep., in the same manner as set forth in Example 1, and the tensile and elongation at this point were 1470 p.s.i. and 8¼ inches. Upon aging at 150° C. for 42 hours, the specimens had a tensile strength of 1350 p.s.i. and an elongation of 8¼ inches. Identical samples, but without the sulfur, showed a rise in tensile from 1750 p.s.i. before irradiation to 2100 p.s.i. thereafter, but these samples failed completely when subjected to the heat aging test, the polyethylene flowing and distorting under the influence of the heat.

Tables I and II below represent additional specific examples of the invention, illustrated in comparison with irradiated, heat-treated polyethylene not containing a cross-linking agent. In considering the results set forth in these tables, it should be noted that polyethylene samples not subjected to irradiation or heat treatment but tested in the same manner as the examples in the tables had a tensile strength of 1260 p.s.i. and an elongation of 1½ inches.

Table I

A COMPARISON OF IRRADIATED, HEAT-TREATED COMMERCIAL POLYTHEYLENE [1] WITH THE IRRADIATED, HEAT-TREATED, BLENDED POLYETHYLENES [2] OF THIS INVENTION—IRRADIATED WITH BETA RAYS [8]

Tests Made on Molded Strips [3]
Heat Treated After Irradiation [4]

| Additives | After 10×10⁶ rep. | | After 35×10⁶ rep. | | After 60×10⁶ rep. | |
|---|---|---|---|---|---|---|
| | Tensile Strength, p.s.i. | Elongation,[5] in. | Tensile Strength, p.s.i. | Elongation,[5] in. | Tensile Strength, p.s.i. | Elongation,[5] in. |
| None | 745 | 1.12 | 643 | 0.68 | 606 | 0.75 |
| 0.5 Sulfur | 1,312 | 1.44 | 1,032 | 1.00 | 1,165 | 1.25 |
| 0.5% of a Bis Sulfonyl Hydrazide [6] | 1,530 | 1.82 | 1,000 | 1.06 | 1,195 | 1.25 |
| 1.0% of a Bis Sulfonyl Hydrazide [6] | 1,530 | 1.88 | 1,165 | 1.25 | 1,042 | 1.06 |
| 0.5% of a Bis Sulfonyl Hydrazide [7] | 1,880 | 2.13 | 1,512 | 1.75 | 1,250 | 1.25 |
| 1.0% of a Bis Sulfonyl Hydrazide [7] | 950 | 1.38 | 978 | 1.25 | 1,080 | 1.12 |
| 5.0% of a Bis Sulfonyl Hydrazide [7] | 1,410 | 1.68 | 1,190 | 1.00 | 1,305 | 1.25 |

[1] All the materials contained 0.1% of 2,2'-methylene bis (3-methyl-6-t-butyl phenol) antioxidant.
[2] All the cellular materials were worked free of bubbles before being molded into strips; materials were non-cellular for these tests.
[3] Strips molded in a hand transfer mold to the dimensions of 3" x 0.50" x 0.125" were notched down to 0.250" x 0.125" for these tests.
[4] All samples were heat treated at 150° C. for 96 hours after irradiation and prior to testing.
[5] Refers to elongation of the 0.140" x 0.250" x 0.125" notched section of each test strip.
[6] p,p'-Oxybis benzene sulfonyl-hydrazide; mixture blended and molded at below blowing point, at a temperature of about 110–115° C.
[7] p,p'-Oxybis benzene sulfonyl-hydrazide; mixture blown at a temperature of about 130° C. during blending operation and worked free of gas bubbles.
[8] Obtained from a resonant transformer type cathode ray machine operating at a peak potential of 70,000,000 Roentgens per min. at room temperature.

Table II

A COMPARISON OF IRRADIATED, HEAT-TREATED COMMERCIAL POLYETHYLENE [1] WITH THE IRRADIATED, HEAT-TREATED, BLENDED POLYETHYLENES [2] OF THIS INVENTION—IRRADIATED WITH GAMMA RAYS [8]

Tests made on molded strips [3]
Heat treated after irradiation [4]

| Additives | After 10×10⁶ rep. | | After 35×10⁶ rep. | | After 60×10⁶ rep. | |
|---|---|---|---|---|---|---|
| | Tensile Strength, p.s.i. | Elongation,[5] in. | Tensile Strength, p.s.i. | Elongation,[5] in. | Tensile Strength, p.s.i. | Elongation,[5] in. |
| None | 745 | 1.12 | 643 | 0.68 | 606 | 0.75 |
| None | 820 | 0.62 | 636 | 0.75 | | |
| 0.5% Sulfur | 1,615 | 1.75 | 1,230 | 1.44 | 1,078 | 1.25 |
| 0.5% of a Bis Sulfonyl Hydrazide [6] | 1,342 | 1.50 | 1,326 | 1.25 | 1,083 | 1.19 |
| 1.0% of a Bis Sulfonyl Hydrazide [6] | 1,280 | 1.31 | 1,330 | 1.50 | 1,062 | 1.38 |
| 5.0% of a Bis Sulfonyl Hydrazide [6] | 990 | 1.00 | 832 | 0.88 | 920 | 1.00 |
| 0.5% of a Bis Sulfonyl Hydrazide [7] | 1,540 | 1.88 | 1,400 | 1.31 | 1,250 | 1.56 |
| 1.0% of a Bis Sulfonyl Hydrazide [7] | 1,335 | 1.75 | 1,198 | 1.50 | 1,012 | 1.12 |
| 5.0% of a Bis Sulfonyl Hydrazide [7] | 1,255 | 1.38 | 1,388 | 1.44 | 1,218 | 1.31 |

[1] All the materials contained 0.1% of 2,2'-methylene bis (3-methyl-6-t-butyl phenol) antioxidant.
[2] All the cellular materials were worked free of bubbles before being molded into strips; materials were non-cellular for these tests.
[3] Strips molded in a hand transfer mold to the dimensions of 3" x 0.50 x 0.125" were notched down to 0.250" x 0.125" for these tests.
[4] All samples were heat treated at 150° C. for 96 hours after irradiation and prior to testing.
[5] Refers to elongation of the 0.140" x 0.250" x 0.125" notched section of each test strip.
[6] p,p'-Oxybis benzene sulfonyl-hydrazide; mixture blended and molded at below blowing point, at a temperature of about 110–115° C.
[7] p,p'-Oxybis benzene sulfonyl-hydrazide; mixture blown at a temperature of about 130° C. during blending operation and worked free of gas bubbles.
[8] Obtained from a cobalt 60 at a rate of 900,000 Roentgens per hour at room temperature.

The cellular irradiated materials are of value not only in the form of wire and cable insulation and jacketing but in coaxial cables, and many pre-formed articles which can be irradiated and which can be advantageously made of cellular organic polymers that possess excellent electrical properties, heat stability, tensile strength and elasticity. Examples of such articles are foamed-in-place insulation for many types of electrical components both single and unitized, for instance, terminal strips, printed circuits, and potted assemblies made up of resistors, transformers, condensers, diodes, etc. The cards or chassis of radio systems may also be made of such light-weight insulating material. Superior insulating materials can be manufactured by irradiating sheets of the cellular plastics. These sheets can then be cut and fitted to areas needing insulation, either electrical or thermal. Articles requiring foamed-in-place thermal insulation can be fabricated and then irradiated to produce high heat stability insulation. Foamed tapes designed for wrapped electrical and/or thermal insulation can be manufactured by the process of this invention.

The irradiation improves not only the pure plastics mentioned above but also these materials in filled form, pigmented form, light stabilized form, in forms stabilized toward oxidation. Fillers which are themselves damaged by irradiation are excluded from the filled plastics mentioned above.

The plastics can be irradiated by a variety of sources including pure gamma-ray sources, linear electron beam accelerators, resonant transformer type cathode ray machines, neutron sources, atomic reactors, X-ray machines, electrostatic electron accelerators, betatrons and waste fission products.

The irradiation of the cellular plastics is in effect an upgrading of useful materials with limited thermal properties to those of considerably improved thermal properties. The economic values of the materials is increased considerably in the process.

The non-cellular irradiated plastics are of use in practically all of the applications ordinarily made of the parent plastics from which the blends are derived. However, the molded articles must be irradiated in their molded form. This extra processing step makes the materials more thermosetting, more heat resistant, generally stronger, and more resistant to flow and distortion at high temperatures. This upgrading in physical properties is significant in many applications of the plastics, especially in the electronics, electrical and nuclear energy fields.

The cellular sheets and blocks which are blown after irradiation are useful as thermal and electrical insulating materials and as general materials of construction.

Having fully described our invention, it is to be understood that we do not wish to be limited to the details set forth, but our invention is of the full scope of the appended claims.

We claim:

1. A process for the treatment of polyethylene comprising incorporating in said polyethylene a minor amount of a member selected from the group consisting of rubber accelerators and vulcanizing agents containing an element selected from the group consisting of sulphur, selenium and tellurium and a sulfonyl hydrazide, and exposing said polyethylene to high energy ionizing radiation to a dosage of at least $1 \times 10^6$ rep., said irradiation dosage being applied at a rate of at least $9 \times 10^5$ Roentgens per hour.

2. A process according to claim 1 wherein the irradiation is carried out to a dosage of between $1 \times 10^6$ rep. and $1 \times 10^8$ rep.

3. A process according to claim 1 wherein the member is elemental sulphur.

4. A process according to claim 1 wherein the member is a sulfonyl hydrazide.

5. A process according to claim 4 in which the sulfonyl hydrazide is a bis-sulfonyl hydrazide.

6. A process according to claim 5 wherein the bis-sulfonyl hydrazide is p,p'-oxy bis(benzene sulfonyl hydrazide).

7. A process according to claim 1 wherein after the irradiation the polyethylene is aged at a temperature of between about 130 and 160° C.

8. A process for the treatment of polyethylene comprising incorporating in said polyethylene a minor proportion of a sulphur containing blowing agent, and exposing said polyethylene to high energy ionizing radiation to a dosage of at least $1 \times 10^6$ rep., said radiation dosage being applied at a rate of at least $9 \times 10^5$ Roentgens per hour.

9. A process according to claim 8 wherein the polyethylene containing the blowing agent is heated to a blowing temperature to form a cellular material and the cellular material is exposed to the high energy ionizing radiation.

10. A process according to claim 9 wherein after the radiation the polyethylene is aged at a temperature of between about 130 and 160° C.

11. A process according to claim 1 wherein the polyethylene is melted before being admixed with the member and the molten mixture is subjected to the high energy radiation.

12. A process according to claim 11 wherein the member is sulphur.

13. A process according to claim 11 wherein the member is a sulfonyl hydrazide.

14. A process for the treatment of polyethylene comprising incorporating in said polyethylene a minor proportion of a sulphur containing blowing agent, heating the polyethylene to a temperature above the blowing temperature to remove gaseous products of the blowing reaction, resulting in a non-foamed product and thereafter exposing the polyethylene to high energy ionizing radiation in an amount of at least $1 \times 10^6$ rep., said radiation dosage being applied at a rate of at least $9 \times 10^5$ Roentgens per hour.

15. A process according to claim 14 wherein the blowing agent is a disulfonyl hydrazide.

16. A process for the treatment of polyethylene comprising incorporating in said polyethylene a minor amount of a vulcanizing agent consisting essentially of sulfur and exposing said polyethylene to high energy ionizing radiation to a dosage of at least about $8.5 \times 10^6$ rep.

17. In a process for the treatment of polyethylene, the steps comprising melting the polyethylene, incorporating in said melt a minor proportion of a disulfonyl hydrazide, forming an article from said mixture at a temperature above the blowing temperature of said disulfonyl hydrazide to produce a cellular structure, and exposing said cellular structure to high energy ionizing radiation at a dose level in the range of $1 \times 10^6$ to $1 \times 10^8$ rep., the radiation being applied at a rate of at least $9 \times 10^5$ Roentgens per hour.

References Cited in the file of this patent

UNITED STATES PATENTS

| | | |
|---|---|---|
| 1,906,402 | Newton | May 2, 1933 |
| 2,668,133 | Brophy et al. | Feb. 2, 1954 |

OTHER REFERENCES

Sessman et al.: ORNL 928, "Physical Properties of Irradiated Plastics," June 29, 1951, Oak Ridge National Laboratory, pages 9–14, 16, 18 and 78–82.

Schmitz et al.: "Science," vol. 113, pages 718, 719, June 22, 1951.

"Modern Plastics," vol. 31, pages 100, 101, 219; April 1954.

Charlesby: "Nucleonics," June 1954, pages 18–25.

Gehmann et al.: Rubber World, vol. 130 (August 1954), pages 643–46.

Bopp et al.: ORNL 1373, July 23, 1953, pages 14–19.

Hunter et al.: Industrial and Engineering Chemistry, vol. 44 (1952), pages 119–122.